United States Patent
Piriou et al.

(10) Patent No.: US 12,408,090 B2
(45) Date of Patent: Sep. 2, 2025

(54) METHOD FOR PREDICTING A MODIFICATION OF THE LINKAGE CONDITIONS OF A TERMINAL TO A CELLULAR NETWORK

(71) Applicant: Continental Automotive GmbH, Hannover (DE)

(72) Inventors: Simon Piriou, Plaisance-du-touch (FR); Grégory Vial, Auragne (FR)

(73) Assignee: Continental Automotive Technologies GmbH, Hannover (DE)

( * ) Notice: Subject to any disclaimer, the term of this patent is extended or adjusted under 35 U.S.C. 154(b) by 276 days.

(21) Appl. No.: 17/603,853

(22) PCT Filed: Apr. 2, 2020

(86) PCT No.: PCT/EP2020/059363
§ 371 (c)(1),
(2) Date: Oct. 14, 2021

(87) PCT Pub. No.: WO2020/212150
PCT Pub. Date: Oct. 22, 2020

(65) Prior Publication Data
US 2022/0201584 A1 Jun. 23, 2022

(30) Foreign Application Priority Data
Apr. 15, 2019 (FR) .................... 1903995

(51) Int. Cl.
*H04W 36/08* (2009.01)
*H04W 36/32* (2009.01)
*H04W 64/00* (2009.01)

(52) U.S. Cl.
CPC ......... *H04W 36/08* (2013.01); *H04W 36/322* (2023.05); *H04W 36/324* (2023.05); *H04W 64/006* (2013.01)

(58) Field of Classification Search
CPC ... H04W 36/32; H04W 36/08; H04W 64/006; H04W 36/008375; H04W 36/322; H04W 36/324
See application file for complete search history.

(56) References Cited

U.S. PATENT DOCUMENTS

| | | | |
|---|---|---|---|
| 8,078,172 B2 * | 12/2011 | Aaron ................... | H04W 36/32 455/442 |
| 9,526,067 B2 * | 12/2016 | Edge ..................... | H04W 36/08 |

(Continued)

FOREIGN PATENT DOCUMENTS

| | | | |
|---|---|---|---|
| CN | 105873137 A | * 8/2016 | |
| CN | 107801157 A | * 3/2018 | ............ H04W 4/026 |

(Continued)

OTHER PUBLICATIONS

Stoyanova, M., & Mähönen, P. (2007). A next-move prediction algorithm for implementation of selective reservation concept in wireless networks doi:http://dx.doi.org/10.1109/PIMRC.2007.4394861 (Year: 2007).*

(Continued)

*Primary Examiner* — Wesley L Kim
*Assistant Examiner* — Swati Jain

(57) ABSTRACT

A method for predicting, for a vehicle that is connected to a current cellular access point and is traveling on a road network, at least one characteristic associated with a modification of the linkage conditions of the vehicle to the cellular network. The method includes: training a first prediction model associated with the current access point from crowdsourced data collected from at least one training vehicle, the data comprising at least a first location, a speed and a direction of the training vehicle as well as a second location of the training vehicle collected when a disconnection from the current access point is detected; and predicting a third location at which a second vehicle will be discon- (Continued)

nected from the current access point while traveling on the road network by applying the prediction model to a location, a speed, and a direction of the second vehicle.

6 Claims, 3 Drawing Sheets

(56) References Cited

U.S. PATENT DOCUMENTS

| | | | |
|---|---|---|---|
| 10,754,341 B2* | 8/2020 | Li | G01C 21/3446 |
| 11,350,335 B2* | 5/2022 | Lin | H04W 36/08 |
| 12,040,880 B2* | 7/2024 | Speidel | H04W 4/02 |
| 2012/0178455 A1* | 7/2012 | Sato | H04W 36/324 |
| | | | 455/436 |
| 2015/0163711 A1* | 6/2015 | Norman | H04W 24/02 |
| | | | 455/436 |
| 2015/0319660 A1* | 11/2015 | Helbert | H04W 36/1446 |
| | | | 455/436 |
| 2016/0066244 A1* | 3/2016 | Agardh | H04W 36/32 |
| | | | 455/436 |
| 2016/0309298 A1* | 10/2016 | Dupray | G01S 1/028 |
| 2018/0075746 A1* | 3/2018 | Jiang | G08G 1/096791 |
| 2018/0152849 A1* | 5/2018 | Wang | G01S 5/02524 |
| 2018/0234901 A1* | 8/2018 | Suh | H04W 36/32 |
| 2018/0310219 A1* | 10/2018 | Karimi-Cherkandi | |
| | | | H04W 36/32 |
| 2019/0200191 A1* | 6/2019 | Gozalvez-Serrano | |
| | | | G08G 1/161 |
| 2019/0281429 A1* | 9/2019 | Nishizaki | H04W 4/44 |
| 2019/0289505 A1* | 9/2019 | Thomas | H04W 68/04 |
| 2019/0316913 A1* | 10/2019 | Golov | G01C 21/30 |
| 2019/0357168 A1* | 11/2019 | Nie | H04W 4/029 |
| 2020/0213925 A1* | 7/2020 | Lin | H04W 36/32 |
| 2021/0159993 A1* | 5/2021 | Studer | H04B 17/364 |
| 2023/0179309 A1* | 6/2023 | Liu | G01S 5/0278 |
| | | | 455/456.1 |

FOREIGN PATENT DOCUMENTS

| | | | | |
|---|---|---|---|---|
| CN | 109041153 A | * | 12/2018 | ............ H04W 36/32 |
| GB | 2354387 A | * | 3/2001 | ........... G01C 21/206 |
| JP | 2009095051 A | * | 4/2009 | |
| KR | 101440086 B1 | * | 9/2014 | ............ H04W 36/32 |
| WO | WO-2013051978 A1 | * | 4/2013 | .......... H04W 36/324 |
| WO | 2016192081 A1 | | 12/2016 | |
| WO | WO-2021074673 A1 | * | 4/2021 | .... H04W 36/008375 |
| WO | WO-2022186458 A1 | * | 9/2022 | |

OTHER PUBLICATIONS

Meetei, K. P., & George, A. (2011). Handoff management in wireless networks using predictive modelling doi:http://dx.doi.org/10.1109/NCC.2011.5734725 (Year: 2011).*

Li Jing et al.: Improving positioning accuracy of vehicular navigation system during GPS outages utilizing ensemble learning algorithm, Information Fusion. Elsevier, US., vol. 35, Aug. 18, 2016 (Aug. 18, 2016), pp. 1-10. (Year: 2016).*

Meetei, K. P. & George, A. (2011). Handoff management in wireless networks using predictive modelling doi:http://dx.doi.org/10.1109/NCC.2011.5734725 (Year: 2011) (Year: 2011).*

Office Action dated Sep. 28, 2023 from corresponding Chinese patent application No. 202080028759.4.

Search Report dated Sep. 28, 2023 from corresponding Chinese patent application No. 202080028759.4.

Li Jing et al. "Improving positioning accuracy of vehicular navigation system during GPS outages utilizing ensemble learning algorithm", Information Fusion, Elsevier, US, vol. 35, Aug. 18, 2016, pp. 1-10, XP029813297, ISSN: 1566-2535.

Search Report dated Jan. 29, 2020 from corresponding French Patent Application No. FR 1903995.

International Search Report and Written Opinion dated Aug. 7, 2020 from corresponding International Patent Application No. PCT/EP2020/059363.

* cited by examiner

[Fig. 1]
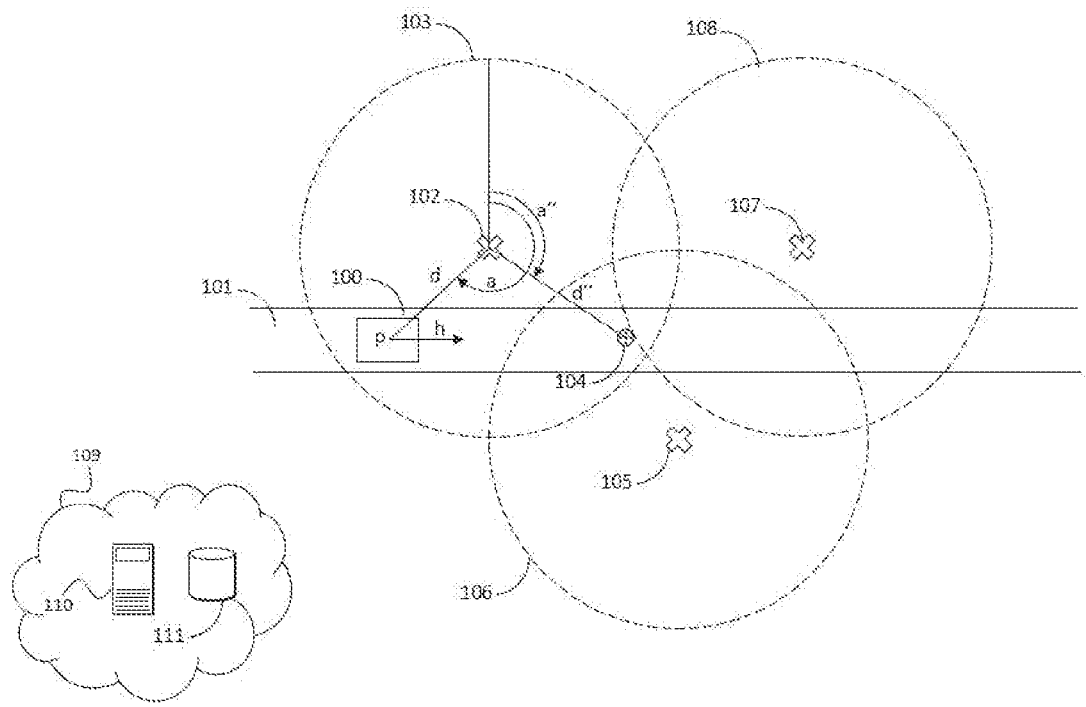
[Fig. 2]
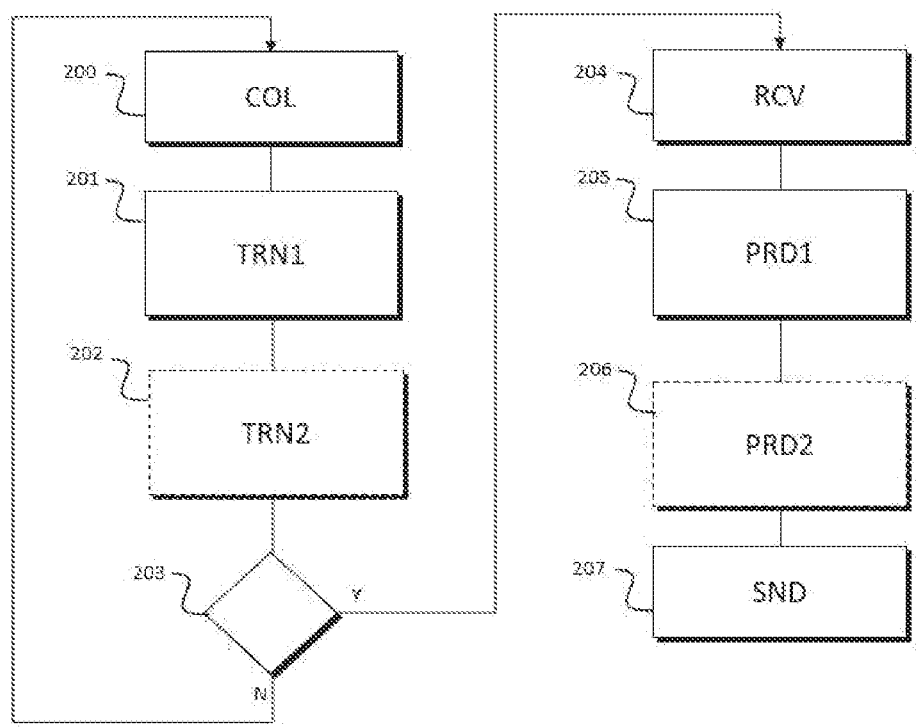

[Fig. 3a]
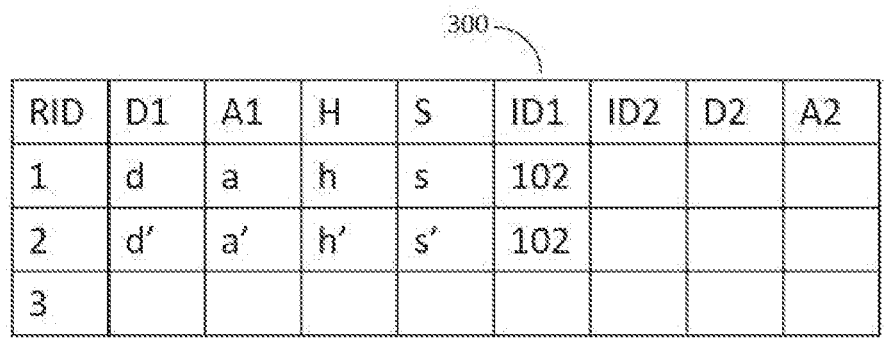
[Fig. 3b]
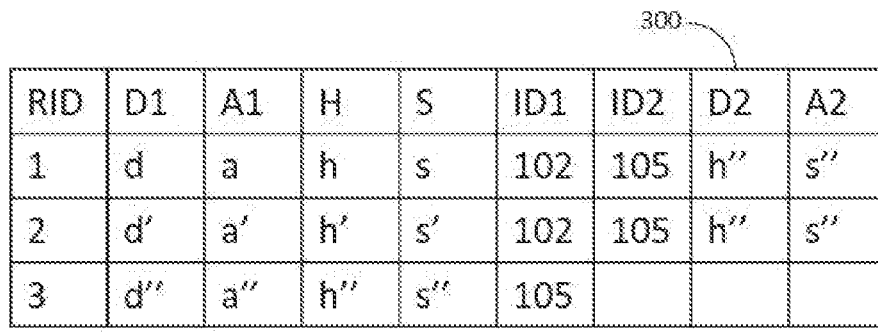
[Fig. 4]
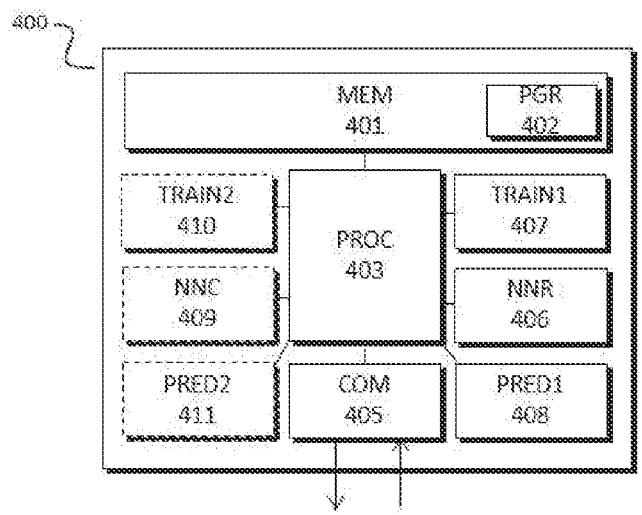

[Fig. 5]
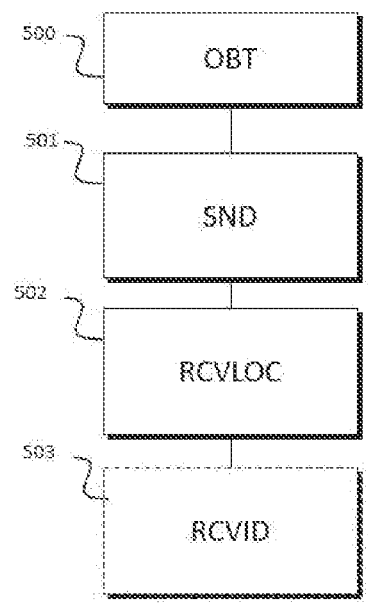
[Fig. 6]
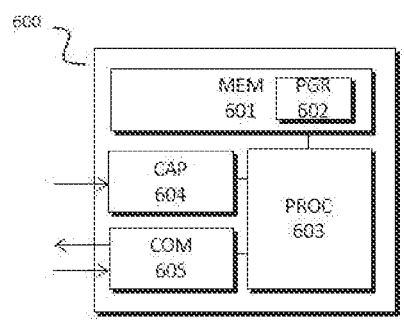

METHOD FOR PREDICTING A MODIFICATION OF THE LINKAGE CONDITIONS OF A TERMINAL TO A CELLULAR NETWORK

BACKGROUND

Technical Field

The invention relates to the field of connected vehicles. It relates in particular to a device and method for predicting a modification of the conditions of linkage of a vehicle to a cellular network.

Prior Art

The availability of a connection to a communications network is a growing problem in the field of transport. In particular, connected vehicles require that a connection be available to transmit or receive data, such as, for example, road maps, traffic information or local weather forecasts.

However, despite the efforts of telecommunications operators, a territory's network coverage is not uniform: some areas are covered by high-speed cellular access technologies such as 4G or 3G, others by low-speed technologies such as GSM, GPRS or EDGE. In addition, some areas, called "white spots", are not covered by a cellular network. Thus, a territory's coverage is often lacking in uniformity in terms of available speed. Consequently, when a connected vehicle makes a journey on a road network, it is faced with different qualities of service.

In order to provide a satisfactory experience for the occupants of a connected vehicle traveling on a road network, it may be advantageous to delay access to certain online services when network conditions are not optimal or, conversely, to pre-empt the downloading of certain data while conditions are optimal. From this perspective, it is advantageous for a connected vehicle to know when the connection conditions are likely to change during a journey.

For this, it is known practice to use network coverage maps produced from distribution data on cellular access points available in a territory. These maps are constructed from radio signal propagation models, the siting of relay antennas and the access technologies that they implement, and topographic data. By matching road maps up with such coverage maps, it is possible to infer the connection quality likely to be encountered by a vehicle over a journey.

However, these maps remain imprecise, in particular regarding the location of handover (intercellular transfer) points. Handover is the process that allows a mobile terminal, such as a connected vehicle, to change its point of linkage to a cellular network. A handover is, for example, required when a connected vehicle leaves the coverage area of a current cell, or when the number of mobile terminals in the cell is too large, to the point of saturating the cell. A handover may occur between two cells using the same technology, or between cells using different technologies. The handover may be initiated by the terminal or initiated by the network.

As handover is a dynamic process, coverage maps do not always make it possible to reliably determine where and when the next handover will occur, nor the access point to which the vehicle will be connected. For example, a handover from an access point A to an access point B for a vehicle moving in a particular direction along a trunk road will not necessarily take place at the same place as a handover from the access point B to the access point A for another vehicle moving in the opposite direction along the same trunk road.

However, knowing the precise location at which a connected vehicle will be disconnected from the current cell, and the connection characteristics that will follow this disconnection, may allow a connected vehicle to optimize access to online resources.

There is therefore a need for a solution that makes it possible to precisely predict a future modification of the linkage conditions of a vehicle connected to a cellular network.

DISCLOSURE OF THE INVENTION

In view of the above, one object of the invention is to determine, for a vehicle that is connected to a current access point and is traveling on a road network, at least one characteristic of a next modification of the linkage conditions to a cellular network.

Another object of the invention is to determine, for a vehicle that is connected to a current access point and is traveling on a road network, a geographical location at which the vehicle will be disconnected from the current access point.

Another object of the invention is to determine a connection characteristic of the vehicle after its disconnection from the current access point.

In this regard, what is proposed is a method for predicting, for a vehicle that is traveling on a road network and is connected to a current access point of a cellular network, at least one characteristic associated with a next modification of the linkage conditions to said cellular network, the method comprising the following steps:
  training a first prediction model associated with the current access point from crowdsourced data collected from at least one training vehicle, the data comprising at least, for locating a training vehicle connected to a current cellular access point:
    a first location, a speed and a direction of the training vehicle, and
    a second location of the training vehicle, collected when a disconnection from the current access point is detected,
  predicting a third location at which a second vehicle will be disconnected from the current access point while traveling on said road network by applying the prediction model to:
  a location, a speed and a direction of the second vehicle.

Thus, the method proposes that crowdsourced data from vehicles be collected in order to train a prediction model in a supervised manner. These data comprise at least a first location, a direction and a speed of the vehicle when it is connected to a current access point, and are supplemented, when a disconnection of the vehicle from the current access point is detected, by a second location at which the disconnection occurred. Disconnection is, for example, due to a handover to a next access point or to the vehicle entering a white spot.

As handover is a dynamic process, the location at which it occurs depends on the movement characteristics of the vehicle.

The handover process requires exchanges of messages between the vehicle and the cellular network. Since these exchanges necessarily take a certain amount of time, the speed of movement of the vehicle has an influence on the location at which the handover is performed. There is thus a correlation between the speed of a vehicle and possible locations at which the vehicle will be disconnected from the current access point.

The location at which a connected vehicle traveling under the coverage of a current access point will be disconnected from this access point further depends on the direction taken by this vehicle. Specifically, it is understood that a second vehicle traveling in the opposite direction to a first vehicle will leave the current access point at a different location from the first vehicle. There is thus a correlation between the direction of a vehicle and possible disconnection locations.

Vehicles, unlike pedestrians, have the particularity of traveling along specific travel corridors. Thus, the location and direction of a vehicle determine a future position of this vehicle, because its movement is constrained by the layout of a road. There is thus a correlation between the current position of a vehicle and possible disconnection locations.

This is why, by training a prediction model associated with a particular access point using positions, speeds and directions of training vehicles connected to this particular access point, which are associated with a location at which these vehicles leave the access point, what is obtained is a model capable of precisely predicting the location at which the disconnection of other vehicles will occur, based on their location, speed and direction. Specifically, these movement characteristics of a training vehicle allow the model to establish correlations with the movement characteristics of another vehicle moving under the coverage of the same access point, and to infer therefrom the location of a next disconnection from the current access point for this other vehicle.

By knowing the location at which it will be disconnected from the current access point, and by combining this information with map data for a road network, a vehicle may advantageously know the distance for which it will remain connected to the same access point and infer, from its speed of movement, the time for which a quality of service associated with this access point will remain available.

According to one particular embodiment, the method is such that the first prediction model is a regression multilayer perceptron neural network.

An MLP (multilayer perceptron) artificial neural network is quick and easy to train. Additionally, a regression MLP is advantageous here because it makes it possible to predict whole values, which are particularly suitable for describing a location.

According to one particular embodiment, the method is such that it further comprises the following steps:
  training a second prediction model from crowdsourced data collected from at least one training vehicle, the data comprising at least, for locating a training vehicle connected to a current cellular access point:
  a location, a speed and a direction of the training vehicle, and
  an identifier of a second cellular access point obtained after detecting its disconnection from the current access point,
  predicting an identifier of a next cellular access point by applying the second prediction model to:
  a location, a speed and a direction of the second vehicle.

The method implements a second prediction model trained in a supervised manner to predict, from a location, a speed and a direction of a vehicle, an identifier of the next access point to which the vehicle will be connected when it has left the current access point. The identifier of the access point may also correspond to a particular identifier associated with an area without coverage, such as a white spot.

Depending on the configuration of the road network, a vehicle may travel on the edge of multiple cells of a cellular network, or occasionally pass through the coverage area of one access point before passing under the coverage of another access point. As mentioned above, the handover process takes a certain amount of time. Thus, the access point to which a handover is performed may depend on the speed of movement of the vehicle, the latter possibly, for example, having passed through a coverage area before having completed the handover procedure. There is thus a correlation between the speed of a vehicle and the access point to which it will be connected after a handover.

A cellular network is, by definition, made up of a set of radio cells forming a checkerboard. Therefore, the identifier of the next cell, or of a white spot, depends on the direction taken by a vehicle leaving a cell. Thus, there is thus a strong correlation between the direction taken by a vehicle traveling through a particular cell and an adjacent cell to which a handover will take place.

Finally, as indicated above, the location and direction of a vehicle determines a future position of this vehicle, because its movement is constrained by the layout of a road. There is thus a correlation between the position of a vehicle and possible identifiers of future access points.

This is why, by training a second prediction model associated with a particular access point using positions, speeds and directions of training vehicles connected to this particular access point, with which is associated, for example, an identifier of an access point to which the training vehicles connect after leaving the current access point, or a white spot identifier, what is obtained is a model capable of precisely predicting the identifier of a next access point or of a white spot based on the location, speed and direction of a vehicle. Specifically, these movement characteristics of a training vehicle allow the model to establish correlations with the movement characteristics of another vehicle moving under the coverage of the same access point, and to infer therefrom an identifier of a next access point or of a white spot.

According to one particular embodiment, the method is such that the first prediction model is a classification multilayer perceptron neural network.

An MLP (multilayer perceptron) artificial neural network is quick and easy to train. Additionally, the outputs of a classification MLP associate reliability indices with potential future access points. Such an arrangement allows the identification of the most probable next access point when a vehicle is liable to connect to a number of next access points.

According to one particular embodiment, the locations of vehicles are locations relative to the current access point.

Thus, the vehicle locations used to train the first and/or the second prediction model, as well as the vehicle locations to which the first and/or second models are applied, are not absolute geographical locations, but positioning data in relation to the access point to which the vehicle is connected. For example, they are polar coordinates given in the form of an angle and of a distance in relation to the access point.

Such an arrangement allows the model to establish correlations between vehicle locations more easily than with longitude/latitude coordinates. Specifically, such an arrangement makes it possible to restrict the ranges of values reflecting the position of a vehicle, thereby facilitating the spatial correlations performed by the model. The result is a more efficient training phase of shorter duration.

According to one particular embodiment, the first and/or the second models are further trained from a first date of collection of crowdsourced data, the corresponding predictions being made by applying a date to the first and/or second models.

Taking account of a date and/or a time at which the training data were collected to train the second prediction model allows the model to establish correlations relating to the periodicity of the characteristics submitted. The intensity of the traffic on a trunk road varies with the day of the week and the time of day. Heavy traffic may cause saturation of a first access point to which the vehicle would have connected in normal times, and force it to connect to a second access point when it leaves a current access point. Thus, the date and/or time is a relevant characteristic for determining an access point to which a vehicle will be connected when leaving a current cell, and consequently a handover location.

According to another aspect, the invention relates to a device for predicting, for a vehicle that is connected to a current cellular access point and is traveling on a road network, at least one characteristic associated with a next modification of the linkage conditions to said cellular network, the device comprising a memory and a processor which is configured by instructions contained in the memory, said instructions being configured to implement:
- a module for training a first prediction model associated with the current access point from crowdsourced data collected from at least one training vehicle, the data comprising at least, for locating a training vehicle connected to a current cellular access point:
- a first location, a speed and a direction of the training vehicle, and
- a second location of the training vehicle, collected when a disconnection from the current access point is detected,
- a module for predicting a third location at which a second vehicle will be disconnected from the current access point while traveling on said road network by applying the prediction model to:
- a location, a speed and a direction of the second vehicle.

According to one particular embodiment, the device is such that the instructions contained in the memory are further configured to implement:
- a module for training a second prediction model from crowdsourced data collected from at least one training vehicle, the data comprising at least, for locating a training vehicle connected to a current cellular access point:
- a location, a speed and a direction of the training vehicle, and
- an identifier of a second cellular access point obtained after detecting its disconnection from the current access point,
- a module for predicting an identifier of a next cellular access point by applying the second prediction model to:
- a location, a speed and a direction of the second vehicle.

The invention also relates to a device for obtaining, by a vehicle that is connected to a current cellular access point and is traveling on a road network, at least one characteristic associated with a next modification of the linkage conditions to said cellular network, the device comprising a communication interface, a memory and a processor configured by instructions contained in the memory and configured to implement, when executed by the processor, the following steps:
- transmission, by the communication module, of a location, a speed and a direction of the vehicle to a server comprising a first prediction model associated with the current access point, the first prediction model being trained from data collected from at least one training vehicle, the collected data comprising, for a training vehicle connected to the current access point, a location, a speed and a direction of the training vehicle, and a second location of the training vehicle, collected when a disconnection from the current access point is detected, and
- reception, by the communication module, of a geographical location at which the vehicle will be disconnected from the current access point, the geographical location at which the vehicle will be disconnected from the current access point being predicted by the prediction server by applying the first prediction model to the location, speed and direction transmitted to the server.

Thus, a vehicle that is traveling on a road network and is connected to a current access point may transmit its geographical location, its speed and its direction to a prediction server implementing the prediction method described above, in order to obtain in return the location at which the next handover will occur, or the location at which the vehicle will be disconnected from the current cell to enter a white spot. In this way, the vehicle may determine for how long it will stay connected to the current access point. For example, the vehicle may use this information to enrich a digital road map and inform occupants of future connection conditions, or to pre-empt a download.

According to one particular embodiment, the obtaining device is such that the server further comprises a second prediction model associated with the current access point, the second prediction model being trained from data collected from at least one training vehicle, the collected data comprising, for a training vehicle connected to the current access point, a location, a speed and a direction of the training vehicle, and an identifier of a second cellular access point obtained after detecting its disconnection from the current access point, the second prediction model being further configured to predict an identifier of a next cellular access point by applying the second prediction model to the location, speed and direction of the vehicle transmitted to the server.

A vehicle may thus transmit its speed, direction and location to a server and receive in return an identifier of the next access point to which it will be connected. From this identifier, the vehicle may, for example, obtain a quality-of-service datum associated with the access point and decide to pre-empt or delay access to an online service or to a download in order to provide an optimal experience to vehicle passengers.

According to yet another aspect, the invention is aimed at a vehicle comprising an obtaining device as described above.

According to yet another aspect, the invention relates to an information medium comprising computer program instructions configured to implement the steps of a prediction method and/or an obtaining method as described above, when the instructions are executed by a processor.

The information medium may be a non-transient information medium such as a hard disk, a flash memory, or an optical disk for example.

The information medium may be any entity or device capable of storing instructions. For example, the medium may comprise a storage means, such as a ROM, RAM, PROM, EPROM, a CD ROM or else a magnetic recording means, for example a hard disk.

The information medium may also be a transmissible medium such as an electrical or optical signal, which may be conveyed via an electrical or optical cable, by radio or by other means.

Alternatively, the information medium may be an integrated circuit into which the program is incorporated, the circuit being suitable for executing or for being used in the execution of the method in question.

The various embodiments or features mentioned above may be added independently or in combination with one another to the steps of the prediction method. The servers, devices and vehicles afford advantages that are at least analogous to those conferred by the methods to which they relate.

BRIEF DESCRIPTION OF THE DRAWINGS

Other features, details and advantages of the invention will become apparent from reading the detailed description below, and from analyzing the appended drawings, in which:

FIG. 1 illustrates a context of implementation of the prediction method according to one particular embodiment, FIG. 2 illustrates the main steps of the prediction method according to one particular embodiment, FIG. 3a shows a table from a suitable database in which there are training data transmitted by a vehicle connected to a current access point, FIG. 3b shows a table from a suitable database in which there are training data transmitted by a vehicle after a handover has been detected, FIG. 4 illustrates the architecture of a device suitable for implementing the prediction method according to one particular embodiment, FIG. 5 shows the main steps of a method for obtaining a characteristic of a next modification of the linkage conditions to a cellular network, according to one particular embodiment of the invention, FIG. 6 illustrates the architecture of a device suitable for implementing the method for obtaining an intercellular transfer characteristic according to one particular embodiment.

DETAILED DESCRIPTION

FIG. 1 shows a vehicle 100 traveling on a road 101 in a direction h. The vehicle 100 comprises a telecommunications interface allowing it to connect to a cellular access network, for example a 2G, 3G, 4G, LTE (Long-Term Evolution) network or else a Wi-Fi or WiMAX access network. Via such an access network, the vehicle 100 may access a telecommunications network 109 and exchange data with other equipment such as the server 110.

The cellular access network comprises a plurality of access points 102, 105 and 107 corresponding, for example, to relay antennas of BTS (base transceiver station), node-B or eNode-B type. FIG. 1 also shows the respective coverage areas 103, 106 and 108 of the access points 102, 105 and 107. These coverage areas 103, 106 and 108 correspond, for example, to cells of the cellular network. Note that the coverage areas of adjacent cells overlap at the cell edge. Conventionally, this overlapping of the coverage areas allows an intercellular transfer procedure (or handover) to be implemented when a mobile terminal, such as the vehicle 100, moves from one cell to another cell. The handover procedure allows a terminal to change radio cell without interrupting a communication in progress. Specifically, when the transmission signal between a mobile terminal and an access point weakens, the mobile terminal searches for another base station available in another cell, which is capable of ensuring the continuation of the communication without interruption.

In the context of this description, the term "access point" will be used to refer to a radio cell. Thus, wording of the type "the access point 102" also refers to the coverage area 103.

Thus, as it moves along the road 101 in the direction h, the vehicle 100 will pass successively through the cells 103, 106 and 108 of the cellular network. On leaving the coverage area of the access point 107 in the direction h, the vehicle will enter a white spot.

An object of the invention is to precisely determine the location at which the vehicle will be disconnected from the current access point 102 to which it is connected. For example, with reference to FIG. 1, the method which will be described aims to determine a location 104 of a handover following which the vehicle 100 will leave the access point 102 and connect to a next access point, and to determine an identifier of this next access point. For a vehicle traveling under the coverage of the access point 107 in the direction h, the method makes it possible to determine a geographical location at which the vehicle will be disconnected from the access point 107 and a characteristic identifier of an area without coverage.

In this regard, what is proposed is a method for predicting at least one characteristic associated with a next modification of the linkage conditions to said cellular network. The method is, for example, implemented by a device comprising a memory and a processor configured by instructions stored in the memory. The instructions are configured to implement the method steps 200 to 206 which will be described. According to one particular embodiment, the predicting device is included in the server 110 shown in FIG. 1.

In a first step 200, crowdsourced data are collected from at least one training vehicle.

Within the meaning of the invention, a training vehicle is a vehicle suitable for traveling on a road network, such as an automobile, a truck, a moped, a bicycle, etc. It may also be a land public transport vehicle such as a streetcar, a bus, a train, etc.

The particularity of a training vehicle is that it is suitable for recording a geographical location, a speed and a direction, and for obtaining an identifier of the access point to which it is connected, and for transmitting such information to a server, for example to the server 110. For this, the vehicle comprises, for example, a satellite positioning device of GNSS type, capable of providing a position in the form of a longitude and a latitude, a speed and a direction of the vehicle, as well as a wireless communication interface allowing it to connect to a communications network and to exchange messages with other equipment.

Consider, for example, that the vehicle 100 shown in FIG. 1 is a training vehicle. The vehicle 100 shown is currently connected to the access point 102 and records its location p, its speed and its direction h.

Preferably, the location of the training vehicle is a location relative to the access point to which it is connected, that is to say, with reference to FIG. 1, a location relative to the access point 102. This location is, for example, given in the form of polar coordinates comprising a distance d in relation to the access point and an angle a in relation to a reference orientation. The position of a vehicle relative to the access point may be determined from an absolute location of the vehicle and that of the access point, the position of the access point being obtained from an identifier of the access point transmitted in the signaling and from a database comprising, for each access point identifier, a location of the base station.

According to one particular embodiment, when a training vehicle detects that it is disconnected from a current access point, the training vehicle adds to the recording with the location at which the disconnection was detected. Thus, the data collected by a training vehicle comprise at least: a location, a speed and a direction of the vehicle which are recorded when it is connected to a current access point, and a location of the vehicle after a handover has been detected, or after a disconnection has been detected. According to one particular embodiment, the collected data further comprise an identifier of the access point to which the vehicle is connected after a handover has been detected. The access point identifier makes it possible to uniquely identify the access point in a territory. This is, for example, a "Cell ID" when the access point is a GSM cell, an "LCID" in the case of a UMTS cell, or an E-CID in the case of an LTE (Long-Term Evolution) cell.

According to one particular embodiment, a particular identifier is assigned to the areas without coverage, called white spots. Thus, when the vehicle detects a loss of connection to the current access point without a new connection being established with a next access point, that is to say when the vehicle has left a current cell to enter a white spot, the collected data further comprise an identifier representative of a white spot. From the point of view of the second prediction model, whether the identifier corresponds to an access point or to a white spot does not affect the prediction in any way. Thus, by assigning a "virtual" cell identifier to a white spot, the method makes it possible to predict not only the identifier of a next access point to which a vehicle will be connected after a disconnection, but also the fact that the vehicle will enter a white spot.

When a training vehicle has collected data, and when a network connection is available, the vehicle transmits the data to the server 110.

According to one particular embodiment, a training vehicle periodically transmits to the server 110 its position, its speed, its direction and the identifier of a current access point to which it is connected. The server 110 stores this information in a database 111.

FIG. 3a shows a table from the database 111. This table comprises fields RID, D1, A1, H, S, ID1 which respectively make it possible to store an identifier of the recording, the location of the vehicle in relation to the current access point in the form of a distance D1 and of an angle A1 in relation to the access point, the direction H and the speed S of the vehicle, as well as an identifier ID1 of the access point to which the vehicle is connected.

The table in FIG. 3a comprises 2 recordings r1 and r2 collected by the vehicle 100. The first recording r1 was made while the vehicle was connected to the access point 102 and it was at a distance d and an angle a in relation to this access point. The vehicle was traveling in a direction h at a speed s.

The second recording was collected while the vehicle was still connected to the access point 102, but at a distance d' and an angle a' in relation to the access point A. It was traveling in a direction h' at a speed v'.

Note that the fields ID2, D2 and A2 are not filled in for these two recordings.

FIG. 3b shows table 300 to which a third recording has been added. This third recording was collected while the training vehicle 100 was at a distance d" and an angle a" in relation to the access point 102, while it was traveling in a direction h" at a speed s", and while it was connected to an access point 105. When the server 110 detects that the current access point has changed, that is to say that the value of the field ID1 of a new recording is different from the value of the field ID1 of the preceding recording, the values D1, A1 and ID1 are respectively copied into the fields D2, A2 and ID2 of the first and second recordings.

In this way, the server may obtain recordings comprising the current access point ID1, the location (D1, A1), the speed S, and the direction H of a training vehicle, which are associated with the identifier of a next access point or a white spot ID2 and a location (D2, A2) corresponding to the location of the next disconnection.

In a step 201, the server uses the collected data to train a first prediction model associated with the access point 102. The first prediction model is, for example, a neural network of regression multilayer perceptron type. The training data comprise at least:
 a location (D1, A1) of the training vehicle,
 a direction (H),
 a speed (S),
 and a location (D2, A2) at which a disconnection from the current cell has been detected.

According to one particular embodiment, in a step 202, the server further uses collected data to train a second prediction model associated with the access point 102. This second prediction model is, for example, a neural network of classification multilayer perceptron type. The training data for the second model comprise at least:
 a location (D1, A1) of the training vehicle,
 a direction (H),
 a speed (S),
 an identifier (ID2) of a next access point or of a white spot.

According to one particular embodiment, the method comprises a step 203 of determining the end of training. The end of training may, for example, be determined by comparing a number of training data submitted as input to the model with a threshold. Thus, until sufficient data have been supplied to the model, training continues.

In step 204, when the training phase has finished, the server 110 receives a request to determine a location of disconnection from the current cell. This is, for example, a message sent by a passenger vehicle traveling under the coverage of the access point 102. The vehicle obtains its position, its speed and its direction from a satellite tracking device and an identifier of the current access point to which it is connected by means of a cellular communication interface. The vehicle transmits this information to the server 110 in order to obtain the location at which it will be disconnected from the access point 102. As already seen, this information may be of use to the vehicle in planning, for example, access to sizable content.

According to one particular embodiment, the request may also comprise a request to determine an identifier of the next access point to which it will be connected.

The server applies the data received to the first prediction model in a step 205. The server determines the first prediction model associated with the access point to which the vehicle is connected and applies this model to the data transmitted by the vehicle. According to one particular embodiment, when the position of the vehicle is transmitted in the form of a longitude and a latitude, and when the first prediction model has been trained using locations relative to an access point, the server first makes a request to a database in order to obtain the location of the access point to which the vehicle is connected and converts the position of the vehicle into polar coordinates relative to this access point.

The application of the first prediction model, trained in step 201, to these data, allows the server to predict the location of the next handover. Specifically, by virtue of the training, the first prediction model was able to establish correlations between a position, a speed and a direction of a vehicle, and the location of a next disconnection. The prediction model uses these correlations to predict the location at which the vehicle will be disconnected from the current cell based on a location, a speed and a direction of a new vehicle.

According to one particular embodiment, the server applies the data received to the second prediction model in a step 206. The server determines the second prediction model associated with the access point to which the vehicle is connected and applies this model to the data transmitted by the vehicle. According to one particular embodiment, when the position of the vehicle is transmitted in the form of a longitude and a latitude, and when the first prediction model has been trained using locations relative to an access point, the server first makes a request to a database in order to obtain the location of the access point to which the vehicle is connected and converts the position of the vehicle into polar coordinates relative to this access point.

The application of the second prediction model, trained in step 202, to these data, allows the server to predict an identifier of the next access point to which the vehicle will be connected after a disconnection. More precisely, since the second model is a classification model, it allows the server to obtain as output one or more points to which the vehicle is likely to connect after disconnection, each of the potential access points being associated by the prediction model with a probability. Thus, with reference to FIG. 1, the model may, for example, predict that the next access point is the access point 105 with a probability of 0.8 or the access point 108 with a probability of 0.2. By virtue of the training, the second prediction model was able to establish correlations between a position, a speed and a direction of a vehicle, and an identifier of a next access point. The prediction model uses these correlations to predict the identifier of the next access point for a location, a speed and a direction of a new vehicle.

Finally, in step 207, the server 110 transmits the result of the predictions to the vehicle that made the request. The vehicle may use the predicted identifier to determine that it will enter a white spot and pre-empt a data download, or else to determine that it will soon be connected to a high-speed access point and defer accessing sizable data.

FIG. 4 shows the architecture of a device 400 suitable for implementing the method for predicting a characteristic associated with a next modification of the linkage conditions to said cellular network according to one particular embodiment.

The device 400 comprises a storage space 401, for example a memory MEM, and a processing unit 403 equipped, for example, with a processor PROC. The processing unit may be controlled by a program 402, for example a computer program PGR, implementing the prediction method described with reference to FIGS. 1 and 2, and in particular the steps of:

training a first prediction model associated with a current access point from crowdsourced data collected from at least one training vehicle, the crowdsourced data comprising at least, for locating a training vehicle connected to a current cellular access point, a first location, a speed and a direction of the training vehicle, and a second location of the training vehicle, which is collected when a disconnection from the current access point is detected, predicting a third location at which a second vehicle will be disconnected from the current access point while traveling on said road network by applying the prediction model to a location, a speed and a direction of the vehicle.

According to one particular embodiment, the computer program PGR is further configured to implement the steps of:

training a second prediction model from crowdsourced data collected from at least one training vehicle, the data comprising at least, for locating a training vehicle connected to a current cellular access point, a location, a speed and a direction of the training vehicle, and an identifier of a second cellular access point obtained after detecting its disconnection from the current access point, predicting an identifier of a next cellular access point for the connection of a vehicle connected to the current access point by applying the second prediction model to a location, a speed and a direction of the vehicle.

On initialization, the instructions of the computer program 402 are, for example, loaded into a RAM (random-access memory) before being executed by the processor of the processing unit 403. The processor of the processing unit 403 implements the steps of the prediction method according to the instructions of the computer program 402.

For this, the device 400 comprises, in addition to the memory 401, communication means 405 (COM) allowing the device to connect to a communications network and to exchange data with other devices via the telecommunications network, and in particular to receive, from at least one training vehicle connected to a particular access point, crowdsourced data comprising at least, for locating a training vehicle connected to a current cellular access point, a first location, a speed and a direction of the training vehicle, and a second location of the training vehicle, which is collected when a loss of connection to the current access point is detected. The communication module is configured to obtain an identifier of an access point to which the vehicle is connected, for example a cell identifier or, when no connection is available, a unique identifier associated with a white spot.

The communication means 405 are, for example, a network interface, such as a Wi-Fi, Ethernet, ATM, optical fiber, etc. interface, suitable for exchanging data in accordance with a communication protocol such as TCP/IP.

The device 400 comprises a first predicting module 406. The predicting module 406 is, for example, a regression artificial neural network implemented by the processor 403 according to computer program instructions stored in the memory 401.

The device 400 also comprises a first training module 407. The module 407 is, for example, implemented by computer program instructions stored in the memory 401 and configured to train the predicting module 406 on the basis of training data received by the communication module 405, in particular on the basis of a location, a speed and a direction of the training vehicle, and of a second location of the training vehicle, which is collected when a disconnection from the current access point is detected. In particular, the instructions are configured to obtain the training data received by the communication module 405, and to submit them to the prediction model 406 in the form of a characteristic vector.

The device 400 also comprises a first predicting module 408, suitable for applying the prediction model 406 to a location, a speed and a direction transmitted by a vehicle and received by the communication module 405. The predicting module 408 is, for example, implemented by computer program instructions configured, when they are executed by the processor 403, to obtain a location, a speed and a direction transmitted by a vehicle to the communication module 405 and to submit these data to the prediction model 406 in the form of a characteristic vector in order to obtain, in return, a location of a next disconnection from the current cell.

According to one particular embodiment, the device 400 comprises a second predicting module 409. The predicting module 409 is, for example, a classification artificial neural network implemented by the processor 403 according to computer program instructions stored in the memory 401.

According to one particular embodiment, the device 400 also comprises a second training module 410. The module 410 is, for example, implemented by computer program instructions stored in the memory 401 and configured to train the predicting module 409 on the basis of training data received by the communication module 405, in particular on the basis of a location, a speed and a direction of the training vehicle, and of an identifier of a next access point, which is collected when a disconnection from the current access point is detected. In particular, the instructions are configured to obtain the training data received by the communication module 405, and to submit them to the prediction model 409 in the form of a characteristic vector.

According to one particular embodiment, the device 400 also comprises a first predicting module 411, suitable for applying the prediction model 409 to a location, a speed and a direction transmitted by a vehicle and received by the communication module 405. The predicting module 411 is, for example, implemented by computer program instructions configured, when they are executed by the processor 403, to obtain a location, a speed and a direction transmitted by a vehicle to the communication module 405 and to submit these data to the prediction model 406 in the form of a characteristic vector in order to obtain, in return, a prediction of an identifier of a next access point.

The communication module 405 is further configured to transmit the predictions made by the modules 411 and 408 to a vehicle connected to the access point with which the prediction models 409 and 406 are associated.

According to one particular embodiment, the device is integrated into a server.

FIG. 5 shows the main steps of a method for obtaining a characteristic of a next modification of the linkage conditions to a cellular network, according to one particular embodiment of the invention.

According to one particular embodiment, the method is implemented by a device on board a vehicle, the device comprising a communication interface, a memory and a processor configured by instructions stored in the memory. The instructions are configured to implement, when they are executed by the processor, steps 500 to 503 of the obtaining method which will now be described.

In a first step 500, the device obtains the position, the speed and the direction of the vehicle in which it is installed from a satellite tracking device. The device further obtains an identifier of the current access point to which the vehicle is connected by means of a cellular communication interface. The location datum corresponds, for example, to a longitude and a latitude, but may also be a location datum relative to the location of the access point to which the vehicle is connected. These are, for example, polar coordinates comprising an angle and a distance in relation to the access point.

In step 501, the device transmits the obtained location, speed and direction, as well as the identifier of the access point to which it is connected, to a server implementing the prediction method as described with reference to FIG. 2.

The device receives, in a step 502, a location datum corresponding to a geographical location at which the device will be disconnected from the current cell, predicted by the prediction server by applying the first prediction model to the location, the speed and the direction transmitted to the server.

According to one particular embodiment, the device further receives, in a step 503, a prediction of an access point identifier associated with an area into which the vehicle will enter when it has passed the predicted location on the road network, by applying the second prediction model to the location, speed and direction transmitted to the server. The predicted access point identifier may be a cell or white spot identifier.

FIG. 6 shows the architecture of a device 600 suitable for implementing the obtaining method according to one particular embodiment.

The device 600 comprises a storage space 601, for example a memory MEM, and a processing unit 603 equipped, for example, with a processor PROC. The processing unit may be controlled by a program 602, for example a computer program PGR, implementing the obtaining method described with reference to FIG. 5, and in particular the steps of obtaining a location, a speed and a direction of a vehicle with which the device is associated and an identifier of an access point to which the vehicle is connected, transmitting the location, speed and direction of the vehicle to a prediction server as described above, comprising a first prediction model associated with the current access point, and receiving a geographical location of a disconnection predicted by a prediction server as described above, by applying the first prediction model to the transmitted data.

According to one particular embodiment, the computer program PGR also implements a step of receiving an identifier of the access point to which the vehicle will be connected after an intercellular transfer or a white spot identifier, the identifier being predicted by a prediction server as described above, by applying a second prediction model to the transmitted data.

On initialization, the instructions of the computer program 602 are, for example, loaded into a RAM (random-access memory) before being executed by the processor of the processing unit 603. The processor of the processing unit 603 implements the steps of the prediction method according to the instructions of the computer program 602.

For this, the device 600 comprises, in addition to the memory 601, a data acquisition module 604 suitable for obtaining, from a satellite tracking device such as a GPS, and/or sensors, a location, a speed and direction taken by a vehicle in which the device is installed. According to one particular embodiment, the acquisition module 604 comprises a tracking device which makes it possible to obtain these data directly.

The device 600 also comprises a communication module 605 (COM). The communication module 605 is, for example, a network interface of 2G, 3G, LTE, etc. type. driven by the processor 603 according to the instructions of the program PGR and suitable for establishing communications and exchanging messages with equipment through a communications network. The communication module 05 is, in particular, suitable for transmitting, according to a communication protocol such as TCP/IP, at least a location, a speed and a direction taken by a vehicle to a prediction server implementing the method described above, and for receiving, in response, a geographical location of a disconnection predicted by a prediction server as described above, by applying the first prediction model to the transmitted data, and/or an identifier of the access point to which the vehicle will be connected after an intercellular transfer or a white spot identifier, the identifier being predicted by a prediction server as described above, by applying a second prediction model to the transmitted data.

According to one particular embodiment, the device is integrated into a vehicle and comprises a screen suitable for displaying, in combination with a map of the road network, a distance to be traveled before the vehicle is disconnected from the current access point and/or characteristics of connection to a cellular network once said distance has been traveled.

The invention claimed is:

1. A method for predicting, for a vehicle that is connected to an access point to a current cellular network and is traveling on a road network, at least one characteristic associated with a modification of the linkage conditions of the vehicle to said cellular network, the method being characterized in that it comprises the following steps:
    training a first prediction model associated with the current access point from crowdsourced data collected from at least one training vehicle, comprising at least, for locating the at least one training vehicle connected to a current cellular access point:
        a first location, a speed, and a direction of the at least one training vehicle, and
        a second location of the at least one training vehicle, collected when a disconnection from the current access point is detected,
    predicting a third location at which the vehicle will be disconnected from the current access point while traveling on said road network by applying the prediction model to:
        a location, a speed, and a direction of the vehicle;
    training a second prediction model from crowdsourced data collected from the at least one training vehicle, the data comprising at least, for locating the at least one training vehicle connected to a current cellular access point:
        a location, a speed, and a direction of the at least one training vehicle, and
        an identifier of a second cellular access point obtained after detecting disconnection of the at least one training vehicle from the current cellular access point,
    predicting an identifier of a next cellular access point by applying the second prediction model to:
        a location, a speed, and a direction of the vehicle, wherein the vehicle locations are locations, relative to the current cellular access point, that are each specified in polar coordinates in the form of a respective angle and a respective distance in relation to the current cellular access point.

2. The method as claimed in claim 1, wherein the first prediction model is a regression multilayer perceptron neural network.

3. The method as claimed in claim 1, wherein the second prediction model is a classification multilayer perceptron neural network.

4. A device for predicting, for a vehicle that is connected to a current cellular network and is traveling on a road network, at least one characteristic associated with a next modification of the linkage conditions to said cellular network, the device comprising a memory and a processor which is configured by instructions stored in the memory, said instructions being configured to implement:
    a module for training a first prediction model associated with the current access point from crowdsourced data collected from at least one training vehicle, comprising at least, for locating the at least one training vehicle connected to a current cellular access point:
        a first location, a speed, and a direction of the at least one training vehicle, and
        a second location of the at least one training vehicle, collected when a disconnection from the current access point is detected,
    a module for predicting a third location at which the vehicle will be disconnected from the current access point while traveling on said road network by applying the prediction model to:
        a location, a speed, and a direction of the vehicle;
    a module for training a second prediction model from crowdsourced data collected from the at least one training vehicle, the data comprising at least, for locating the at least one training vehicle connected to a current cellular access point:
        a location, a speed, and a direction of the at least one training vehicle, and
        an identifier of a second cellular access point obtained after detecting disconnection of the at least one training vehicle from the current cellular access point,
    a module for predicting an identifier of a next cellular access point by applying the second prediction model to:
        a location, a speed, and a direction of the vehicle, wherein the vehicle locations are locations, relative to the current cellular access point, that are each specified in polar coordinates in the form of a respective angle and a respective distance in relation to the current cellular access point.

5. The device as claimed in claim 4, wherein the first prediction model is a regression multilayer perceptron neural network.

6. The device as claimed in claim 4, wherein the second prediction model is a classification multilayer perceptron neural network.

* * * * *